(12) United States Patent
Cooper

(10) Patent No.: US 9,445,014 B2
(45) Date of Patent: Sep. 13, 2016

(54) SELECTIVE IMAGE AND OBJECT ENHANCEMENT TO AID VIEWER ENJOYMENT OF PROGRAM

(76) Inventor: J. Carl Cooper, Los Gatos, CA (US)

( * ) Notice: Subject to any disclaimer, the term of this patent is extended or adjusted under 35 U.S.C. 154(b) by 630 days.

(21) Appl. No.: 11/514,075

(22) Filed: Aug. 30, 2006

(65) Prior Publication Data
US 2008/0056533 A1  Mar. 6, 2008

(51) Int. Cl.
*H04N 5/262* (2006.01)

(52) U.S. Cl.
CPC ..................... *H04N 5/262* (2013.01)

(58) Field of Classification Search
USPC ............... 348/208.14, 157; 382/103
See application file for complete search history.

(56) References Cited

U.S. PATENT DOCUMENTS

| | | | | |
|---|---|---|---|---|
| 5,923,365 A * | 7/1999 | Tamir et al. | ................... | 348/169 |
| 6,064,429 A * | 5/2000 | Belk et al. | ................... | 348/128 |
| 6,141,060 A * | 10/2000 | Honey et al. | ................. | 348/578 |
| 6,154,250 A * | 11/2000 | Honey et al. | ................. | 348/157 |
| 6,847,733 B2 * | 1/2005 | Savakis et al. | ............... | 382/225 |
| 6,879,248 B2 * | 4/2005 | Flick | .............................. | 340/435 |
| 2001/0005218 A1 * | 6/2001 | Gloudemans et al. | ........ | 348/157 |
| 2001/0026319 A1 * | 10/2001 | Honey et al. | ................. | 348/169 |
| 2003/0001954 A1 * | 1/2003 | Rantalainen | ................... | 348/136 |
| 2003/0095080 A1 * | 5/2003 | Colmenarez et al. | ............ | 345/7 |
| 2004/0236791 A1 * | 11/2004 | Kinjo | ........................ | 707/104.1 |

* cited by examiner

*Primary Examiner* — Mark Monk

(57) ABSTRACT

A system and method is provided for enhancement of an object in a video frame, where the method includes recognizing and locating an object within an image frame and performing an automatic enhancement process on the object. The automatic enhancement process may include performing image and/or object enhancement on the object to make the object easier for an observer to detect. Such object enhancement may include enhancement to part of the object, such as the perimeter of the object, or to the entire object, and may also include varying enhancement, such as causing enhancing features to blink, flash or otherwise change to catch a viewer's attention, making the object easier to detect.

15 Claims, 5 Drawing Sheets

SELECTIVE IMAGE AND OBJECT ENHANCEMENT TO AID VIEWER ENJOYMENT OF PROGRAM

BACKGROUND

Image enhancement including contrast enhancement and detail sharpening techniques are well known in the television and electronic still photography industries. Generally prior art image enhancement techniques electronically process electronic forms of still and moving images, for example such as analog and digital video signals carrying images, digital data representing images and other electronic forms of images. The electronic processing operates to alter characteristics of images such as by increasing contrast of low contrast images, decreasing contrast of high contrast images, sharpening lines and edges and increasing high frequency detail amplitude. Overall these prior art electronic processing of images are intended to improve the visual quality of images to facilitate enjoyment of the image by the viewer.

It is noted that the prior art includes many examples of selectively enhancing images by intentionally applying an unnatural coloring or contrast to the image or its position. One example is given in U.S. Pat. Nos. 6,154,250 and 5,564,698 to Honey, et al. in which the televised image of objects such as a hockey puck is caused to be enhanced when presented, for example by leaving a colored trail of its motion across the ice. Note in one of Honey's embodiment the puck itself is not enhanced, rather a colored line representing its path is electronically added to the image.

The Honey et al. '250 abstract states "A system for enhancing the television presentation of an object at a sporting event includes one or more sensors which are used to determine the location of the object. Based on the location of the object and the field of view of a broadcast camera, a processor determines the position of the object in a video frame of the broadcast camera. Once knowing where the object is positioned within the video frame, the television signal can be edited or augmented to enhance the presentation of the object." While the Honey et al. system works, it requires a considerable amount of specialized equipment, such as the modified hockey puck and specialized position sensors. Also, the Honey et al. system does not locate the hockey puck within the program video image itself, but rather locates the puck utilizing the specialized puck and specialized position sensors and then using that information to locate the puck in the program video frame, enhances the presentation of the puck.

Another example of unnatural prior art image enhancement is in ubiquitous highlighting of important text images by electronically underlining, changing color of the text or coloring the background with a yellow (or other color) highlighting. Yet another example of unnatural prior art enhancement is the drawing of arrows, circles, lines or the like on television scenes such as by a weather reporter who electronically marks important weather images to call the viewer's attention thereto. These prior art techniques share a common attribute of highlighting—an unmoving image or relatively slowly moving images.

Thus, there exists a need in the art for a system and method for improved image enhancement. As will be seen, the invention provides such a system and method in an elegant manner.

DETAILED DESCRIPTION

Figure 1:
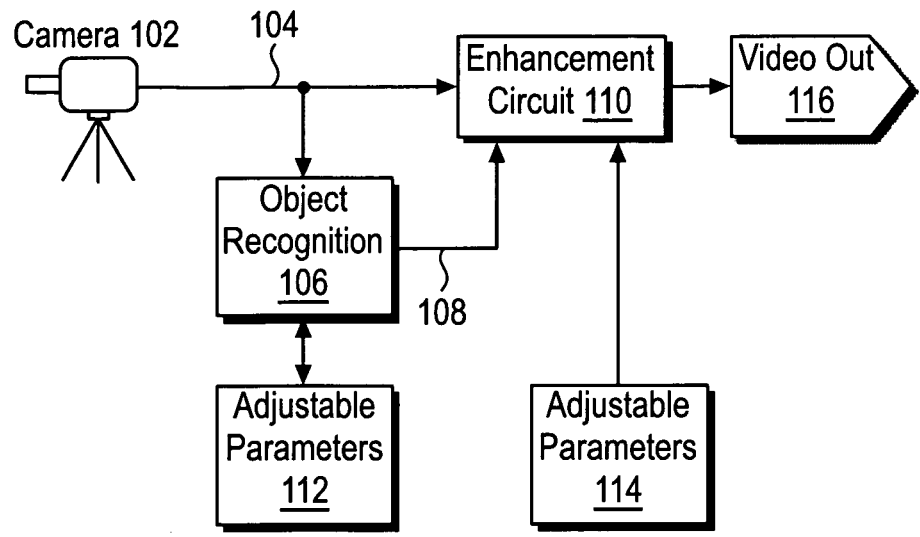
FIG. 1 is a diagramatic view of a system configured according to the invention.

The invention is directed to a system and method of providing enhancement of an object in a video frame by first recognizing and locating an object within an image frame and performing an enhancement process on the object. The enhancement process may include performing image or object enhancement on the object to make the object easier for an observer to detect. The video recognition techniques include recognizing an object by identifying characteristics of the object using video recognition techniques. The video recognition techniques may include identifying size, color, surface texture, brightness, histograms, shape or other characteristics.

Various embodiments of a system and method are described below that are provided for enhancement of an object in a video frame. The method includes recognizing and locating an object within an image frame and performing an automatic enhancement process on the object. The automatic enhancement process may include performing image and/or object enhancement on the object to make the object easier for an observer to detect. Such object enhancement may include enhancement to part of the object, such as the perimeter of the object, or to the entire object. Object enhancement will be understood to include operations which help make an object more pleasing to view by hiding, covering, disguising or otherwise reducing the visibility of blemishes and flaws on objects in electronic photographs or videos. Examples of such enhancement include whitening teeth, adding a tan to skin, softening wrinkles, removing blemishes or hiding beard shadows on faces. Object enhancement may also include varying enhancement, such as causing enhancing features to blink, flash or otherwise change to catch a viewer's attention, making the object easier to detect.

In one method, providing enhancement of an object in a video frame may include first receiving video data, then searching for an object within an image frame. Then, an object is recognized and located within a frame, and an automatic enhancement process is performed on the object.

In another embodiment, after receiving video data, the process then determines whether object enhancement is activated. If object enhancement is activated, the process performs searching for an object within an image frame. Then, an object is recognized and located within a frame, and an automatic enhancement process is performed on the object.

In yet another embodiment, after receiving video data, an image frame is searched for an object where enhancement is desired. If an object is found, it is determined whether object enhancement is activated. It is also determined whether temporal enhancement is activated. These past two steps may be performed separately, together or in different order. If object enhancement is activated and temporal enhancement is not activated, the process performs an automatic enhancement process on the object. If object enhancement is activated and temporal enhancement is activated, then the process performs an automatic enhancement process on the object for a set duration.

In yet another embodiment after receiving video data and searching for an object within an image frame, it is determined whether object enhancement is activated. If object enhancement is activated, it is then determined whether temporal enhancement is activated. If object enhancement is activated and temporal enhancement is not activated, then an automatic enhancement process is performed on the object. If object enhancement is activated and temporal enhancement is activated, the process performs an automatic enhancement process on the object according to a timing algorithm.

In either of these methods, a timing algorithm may be configured to cause the enhancement of the object to blink, flash or to be enhanced during a predetermined time periods to cause the enhancement of the object to appear non-continuous to the user. The received video data may be one or more frames of video data, or multiple, a plurality, of frames.

As used herein, image enhancement is meant to have a narrower meaning than that generally used in the art. Image enhancement as used hereinafter in the specification and claims means electronic processing of images, carried or stored in electronic form, to improve the natural appearance and visibility thereof to facilitate visibility and enjoyment of the image when it is ultimately viewed by a viewer.

As used herein, object enhancement is meant to have a narrower meaning than that generally used in the art. Object enhancement as used hereinafter in the specification and claims means electronic processing of images, carried or stored in electronic form, to improve the visibility of one or more object within an image. This may be done by giving the object a natural, yet improved appearance so that it is draws a viewer's attention more or so that it is more easily detectable to a user that may wish to follow the object more easily as it travels across or about a video presentation. This may also be done by giving an object an unnatural appearance, where an enhanced object is more obvious to a user, more clear or more overtly highlighted.

These definitions of image enhancement and object enhancement will find particular applicability to particular objects in televised images as will be described in more detail below. It may be noted that image enhancement and object enhancement as defined herein are not mutually exclusive, and can be applied to a television image simultaneously. For example a ball may be image enhanced to make it appear sharper and also object enhanced by circling it with a red border. Either enhancement may include a temporal aspect, for example by flashing the enhancement or by providing enhancement for only a portion of the time a ball is visible.

Unfortunately many conventional image enhancement techniques known in the prior art must be manually or automatically adjusted in order not to over enhance images. Such over enhancement can lead to objectionable visual artifacts, for example such as ringing on edges, and contrast or detail taking on an artificial or unnatural look. The level of desired enhancement varies depending on the particular scene and may change during changes in the scene such as camera movement, lighting changes or movement of objects in the scene. According to the invention, objects can be specifically recognized and targeted, allowing for consistent and predictable enhancement that is more enjoyable to a viewer.

Of particular interest in respect to the invention is the use of image enhancement for televised events where a ball, puck, birdie, fowl, fish, animal or other object that moves quickly in its physical environment. Such an object moves quickly within the television image frame (which may be a field in interlaced display systems). Such an image may appear relatively small in the television image frame. Thus, in either case, it is difficult for a viewer to see the object, which can be frustrating to watch. It will be recognized that the invention is useful in many types of still and motion imaged sporting events and the like. However, for purposes of illustrating and describing one embodiment of the invention, television coverage of the game of golf will be utilized as an example.

In televising golf, it is desired to have continuous camera images of the golf shots starting with the ball on the tee, through the swing and hit, as it is flying down the fairway, as it lands through when it rolls to a stop. Unfortunately for a significant period of this travel, the ball moves very quickly in its physical environment and despite the skills of the cameraman, the ball moves within the television frame and appears very small in the television image frame for much of the shot. In such instances, image enhancement (to enhance the natural visibility of the ball) is desirable in order provide better visibility to the viewer. Additionally object enhancement is also desirable, for example such as by changing the color of the ball to further improve the visibility to the viewer. Unfortunately, Honey's system is unsuitable in this application due to the difficulty in installing emitters in the golf ball and the large number of location sensors which would be required to cover an entire golf course.

In order to provide either image enhancement or object enhancement of the golf ball (or both) the invention utilizes object recognition to locate a desired object within the image frame (or frames) and, once the object is located, image enhancement and/or object enhancement is performed on the object. In the example of a televised golf game, characteristics of the golf ball for example such as its size, color, surface texture, brightness, histograms or shape are utilized to recognize and locate the golf ball in each image frame of the televised images. When located, the golf ball is then image enhanced or object enhanced or both.

In FIG. 1, one embodiment of the invention is shown. An imaging device such as a television camera 102 provides an electronic representation of the image 104 which for example may be in the preferred form of a digital image carried by a video signal. The digital image is coupled to an object recognition circuit 106 and to an image and object enhancement circuit 110. The object recognition circuit 106 operates to inspect the digital image 104 and identify the presence of the desired object, in the preferred embodiment the golf ball. When the presence of the desired object is detected, its location within the frame is determined and the location information is conveyed via electronic signal 108 to the image and object enhancement circuit 110. Electronic signal 108 may take on the form of a video key signal commonly utilized in the television production industry to drive video special effects devices. Image and object enhancement circuit 110 operates to provide the desired image and/or object enhancement to the digital image and output the modified image for ultimate viewing.

In the preferred embodiment it is desired that the image and object enhancement circuit 110 include adjustable parameters 114 to allow the type and amount of image and/or object enhancement to be utilized to the identified objects (golf balls). The parameters may be automatically established by 110 in response to the image, 104 or may be established by a user or a combination of user and automatically established parameters may be utilized.

In one embodiment, the video data input 104 can be coupled to adjustable parameters circuit 114, where the input video data is received by circuit 114 via enhancement circuit 110, by two way connection 111 as shown. In this embodiment, the special parameters are established by adjustable parameters circuit 114 instead of enhancement circuit 110 in response to the input video data 104. Alternatively, connection 111 may be a one-way connection from the adjustable parameters circuit 114 to enhancement circuit 110. In such an embodiment, the special parameters may be established in enhancement circuit 110 using the parameters of adjustable parameters circuit 114 that would send the adjustable parameters to enhancement circuit 110.

It is also desired that the object recognition circuit 106 may include parameters 112 to allow the characteristics of the object which are to be utilized in its location. The parameters may be automatically established by 112 in response to the image 104 via the two way connection 113, or may be established by a user or a combination of user and automatically established parameters may be utilized. Automatic updating or modification of the parameters based on successful location of objects in the image frame is also desirable.

Object recognition circuit and adjustable parameters 112 may be implemented by any well know object recognition circuit or software. For example, numerous inventions found in class 382/170 will find application for the object recognition circuit. U.S. Pat. No. 6,952,496 entitled "Object Recognition System and process for Identifying People and Objects in an Image of a Scene" is one example of object recognition with automatic updating of image parameters which may be utilized.

Image and object enhancement circuit 110 may be implemented by any well known video image processing circuitry or software. In the preferred embodiment image and object enhancement circuit of FIG. 102 is preferred.

Figure 2:
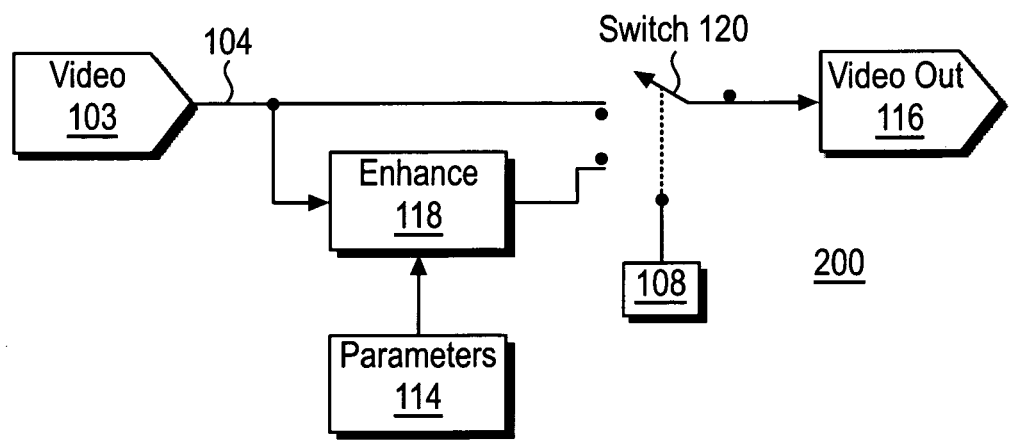
FIG. 2 is a diagramatic view of a system configured according to the invention.

FIG. 2 shows the preferred embodiment circuit of video and object enhancement circuit 118 of FIG. 1. The video signal 104 is received and coupled to the normally closed terminal of a two input video selector switch 120. Selector 120 may be implemented by a semiconductor video multiplexer IC. The switch position is controlled by key signal 108 such that when the desired object is present the output video from 120 is taken from the enhance circuit 118 and when the desired object is not present the output video from 120 is (or is a version of) the input video 104.

Enhance circuit 118 with parameters 114 is preferred to be a video graphics device with capability to sharpen detail and highlight objects by changing background colors according to user inputs of parameters 114. Manufacturers including Thomson Grass Valley of Grass Valley, Calif., Snell and Wilcox of Santa Clara, Calif. and Sony Broadcast of San Jose, Calif. provide many versions of such products. By incorporating a down stream keyer in the video graphics device the capability of video selector 120 may be incorporated.

Figure 3:
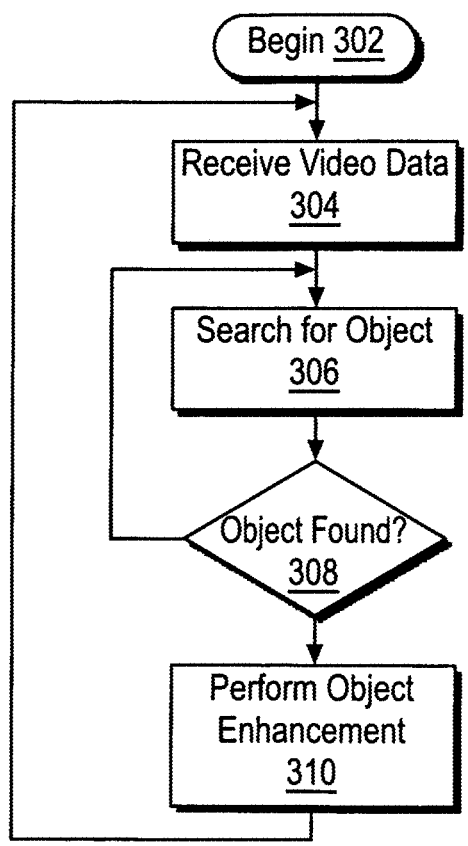
FIG. 3 is a method flow chart of process steps configured according to the invention.

Referring to FIG. 3, a flow chart illustrating one embodiment of the invention is illustrated. The process begins at step 302, and video data is received, for example one or more frames of video, in step 304. In step 306, the process searches for an object to be enhanced. It is then determined whether an object is found in step 308. If not, the process returns and continues to search in step 306. If a desired object is found, the process proceeds to step 310, where enhancement is performed on the object. The process then returns to step 304 where the video data is again received.

Figure 4:
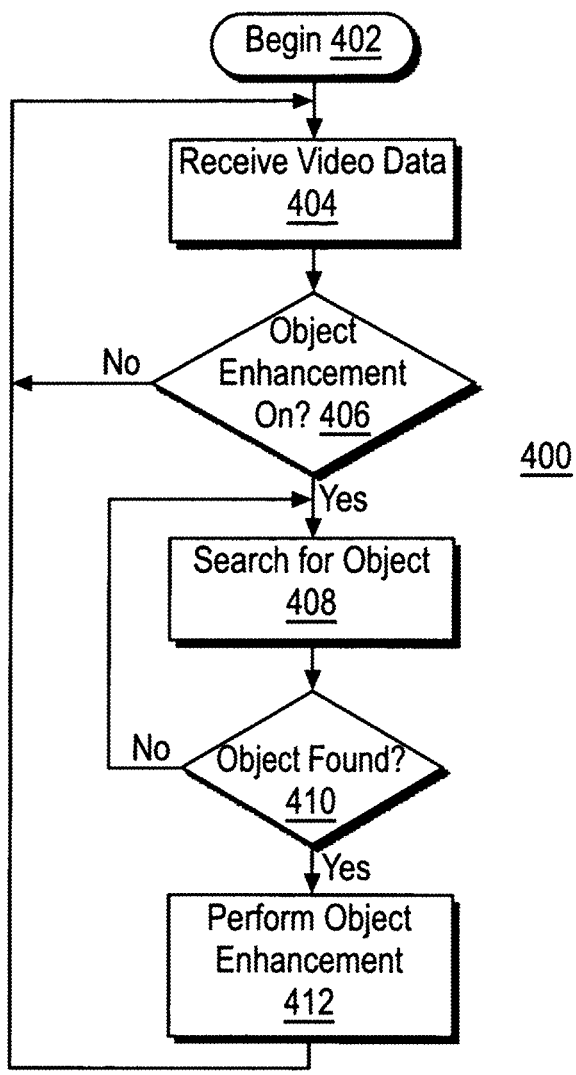
FIG. 4 is a method flow chart of process steps configured according to the invention.

Referring to FIG. 4, another flow chart illustrates another embodiment of the invention. The process begins at step 402, and video data, for example one or more frames of video, is received in step 404. In step 406, the process determines whether object enhancement is activated in the system. If it is not on, then the process returns to step 404 to continue receiving data. If it is on, then the process searches for a desired object in step 408. It is then determined whether an object is found in step 410. If not, the process returns and continues to search in step 408. If a desired object is found, the process proceeds to step 412, where enhancement is performed on the object. The process then returns to step 404 where the video data is again received.

Figure 5:
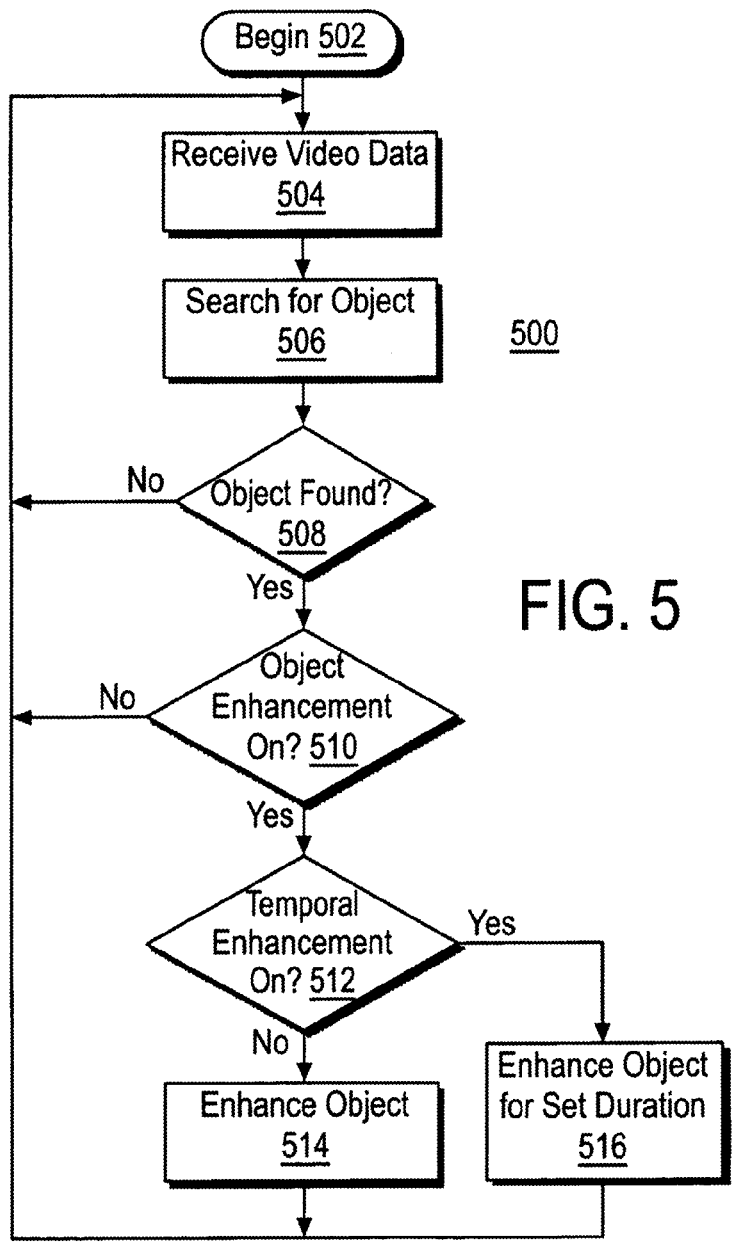
FIG. 5 is a method flow chart of process steps configured according to the invention.

Referring to FIG. 5, yet another flow chart illustrates another embodiment of the invention. The process begins at step 502, and video data, for example one or more frames of video, is received in step 504. In step 506, the process searches for an object. In step 508, it is determined whether an object is found. If not, then the process returns to step 504 to continue receiving video data. In step 510, if an object is found in step 508, the process determines whether object enhancement is activated in the system in step 510. If it is not on, then the process returns to step 504 to continue receiving data. If it is on, the process proceeds to step 512, where it is determined whether temporal enhancement is on. If temporal enhancement is not on, then non-temporal enhancement is performed on the object in step 514. If it is, then the process proceeds to step 516, where the object is enhanced for a predetermined period of time or data events such as frames. The process then returns to step 504 where the video data is again received.

Figure 6:
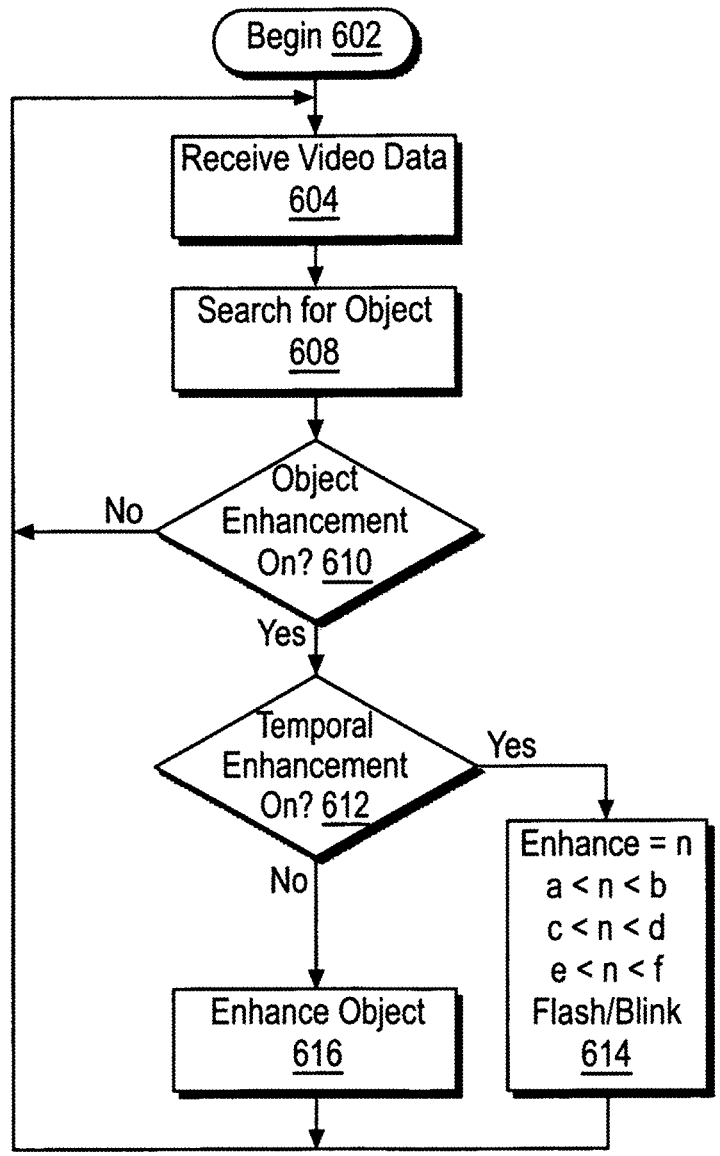
FIG. 6 is a method flow chart of process steps configured according to the invention.

Referring to FIG. 6, yet another flow chart illustrates another embodiment of the invention. The process begins at step 602, and video data, for example one or more frames, is received in step 604. The process searches for an object in step 606. In step 608, it is determined whether an object that is desired for enhancement is found. If not found, the process loops back to step 604 where video data is continually received. In step 610, the process determines whether object enhancement is activated in the system. If it is not on, then the process returns to step 604 to continue receiving data. If object enhancement is on, the process proceeds to step 612, where it is determined whether temporal enhancement is on. If it is, then the process proceeds to step 614, where the object is enhanced according to a predetermined algorithm. As will be understood by those skilled in the art, many different algorithms are possible to cause the enhancement of the object to flash or blink. The algorithm illustrated is one embodiment, where the enhancement is activated over different time periods. According to the illustrated embodiment, the time periods are from a to b, then c to d, then e to f, and so on. During these time periods, the enhancement can be activated, and the resulting view to a user is a blinking or flashing enhancement of the object. For example, a golf ball traveling across a video screen is very difficult to see in real time after a golfer hits the ball. According to the invention, the ball can be enhanced to improve the view. However, even an enhanced object may not be visible enough to a user to detect it on a video screen, such as a golf ball traveling at a high speed in real time and from a distance. According to the embodiment illustrated in FIG. 6, a flashing enhancement would be more detectible if it blinked, drawing attention from a user. If temporal enhancement is not on, then non-temporal enhancement is performed on the object in step 616. The process then returns to step 604 where the video data is again received. Of course, the above described operation with one object given by way of example may be expanded to more than one object as desired. For example it may be desired to enhance both the ball and the club, or the ball and the hole. The objects may be enhanced by different amounts and/or in different fashions.

In either of these embodiments, the various components or process steps may be rearranged or interchanged depending on a particular application, and those skilled in the art will understand that such changes can be made without departing from the spirit and scope of the invention, which is defined by the appended claims and their equivalents.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a system and method for enhancing an object within a video image. Although this embodiment is described and illustrated in the context of devices, systems and related methods of enhancing images within a video presentation of a golf game, the scope of the invention extends to other applications where such functions described herein are useful. Furthermore, while the foregoing description has been with reference to particular embodiments of the invention, it will be appreciated that these are only illustrative of the invention and that changes may be made to those embodiments without departing from the principles of the invention.

The invention claimed is:

1. A method of providing electronic enhancement of an object in a video frame, comprising:
   receiving video data;
   evaluate the video data to identify image parameters;
   searching for an object within the video data making up the video frame using only the received video data;
      if an object is found within the video data, determining whether object enhancement is activated;
         determining whether object enhancement is activated;
         determining whether temporal enhancement is activated;
         if object enhancement is activated and temporal enhancement is not activated, performing an automatic electronic enhancement process on the object in accordance with the image parameters; and
         if object enhancement is activated and temporal enhancement is activated, performing an automatic electronic enhancement process on the object in accordance with the image parameters for a set duration.

2. A method of providing electronic enhancement of an object in a video frame, comprising:
   receiving video data;
   evaluating the video data to identify image parameters;
   searching for an object within the video data making up the video frame using only video data;
   determining whether object enhancement is activated;
      if object enhancement is activated, determining whether temporal enhancement is activated;
      if object enhancement is activated and temporal enhancement is not activated, performing an automatic electronic enhancement process on the object in accordance with the image parameters; and
      if object enhancement is activated and temporal enhancement is activated, performing an automatic electronic enhancement process in accordance with the image parameters on the object according to a timing algorithm.

3. A method according to claim 2, wherein the timing algorithm is configured to cause the enhancement of the object to blink.

4. A method according to claim 2, wherein the timing algorithm is configured to cause the enhancement of the object to flash.

5. A method according to claim 2, wherein the timing algorithm is configured to cause the enhancement of the object to be enhanced during a predetermined time periods to cause the enhancement of the object to appear non-continuous to the user.

6. A method according to claim 1, wherein the received video data is at least one frame of video data.

7. A method according to claim 2, wherein the received video data is at least one frame of video data.

8. A method according to claim 1, wherein the received video data is a plurality of frames of video data.

9. A method according to claim 2, wherein the received video data is a plurality of frames of video data.

10. A method according to claim 1, wherein the automatic electronic enhancement process on the object includes one or more of temporal processing, resolution enhancement, false color enhancement, softening wrinkles, whitening teeth, adding a tan to skin, softening wrinkles, removing blemishes and hiding beard shadows on faces.

11. A method according to claim 1, wherein the automatic electronic enhancement process on the object is selectively applied according to the location information.

12. A method according to claim 1, wherein the location information is in a form of video key signal.

13. A method according to claim 2, wherein the automatic electronic enhancement process on the object includes one or more of temporal processing, resolution enhancement, false color enhancement, softening wrinkles, whitening teeth, adding a tan to skin, softening wrinkles, removing blemishes and hiding beard shadows on faces.

14. A method according to claim 2, wherein the automatic electronic enhancement process on the object is selectively applied according to the location information.

15. A method according to claim 2, wherein the location information is in a form of video key signal.

* * * * *